US009904654B2

(12) United States Patent
Campbell et al.

(10) Patent No.: US 9,904,654 B2
(45) Date of Patent: Feb. 27, 2018

(54) PROVIDING I²C BUS OVER ETHERNET

(71) Applicant: International Business Machines Corporation, Armonk, NY (US)

(72) Inventors: Alexander P. Campbell, Ottawa (CA); Keshav G. Kamble, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 15/003,751

(22) Filed: Jan. 21, 2016

(65) Prior Publication Data

US 2016/0154766 A1    Jun. 2, 2016

Related U.S. Application Data

(60) Continuation of application No. 14/606,982, filed on Jan. 27, 2015, now Pat. No. 9,282,062, which is a
(Continued)

(51) Int. Cl.
*H04L 12/931* (2013.01)
*G06F 13/42* (2006.01)
(Continued)

(52) U.S. Cl.
CPC .......... *G06F 13/4282* (2013.01); *G06F 13/24* (2013.01); *G06F 13/385* (2013.01);
(Continued)

(58) Field of Classification Search
CPC .... G06F 13/24; G06F 13/385; G06F 13/4022; G06F 13/4068; G06F 13/4282;
(Continued)

(56) References Cited

U.S. PATENT DOCUMENTS 7,010,639 B2    3/2006  Larson et al.
7,039,046 B1 *  5/2006  Simons ................... H04L 49/15
                                               370/218
(Continued)

OTHER PUBLICATIONS

Final Office Action from U.S. Appl. No. 14/606,966, dated Feb. 26, 2016.
(Continued)

*Primary Examiner* — Khaled Kassim
*Assistant Examiner* — Zhaohui Yang
(74) *Attorney, Agent, or Firm* — Zilka-Kotab, P.C.

(57) ABSTRACT

In one embodiment, a method includes receiving a request from a remote distributed fabric protocol (DFP) system master, using a dedicated processor of a DFP system member, to register local I²C devices on the DFP system member, and sending an acknowledgement including a list of local I²C bus devices back to the DFP system master using the dedicated processor of the DFP system member. The acknowledgement present on the DFP system member. In another embodiment, a system includes a local processor, one or more local I²C bus devices, and a dedicated processor electrically coupled to the local I²C bus devices. The dedicated processor is configured to route interrupts from the local I²C bus devices to the local processor, and expose the local I²C devices to a remote DFP system master by sending details of the local I²C bus devices to the remote DFP system master.

19 Claims, 7 Drawing Sheets

Related U.S. Application Data division of application No. 13/487,072, filed on Jun. 1, 2012, now Pat. No. 8,984,201.

(51) Int. Cl.

| | | |
|---|---|---|
| *G06F 13/38* | (2006.01) | |
| *G06F 21/85* | (2013.01) | |
| *H04L 29/06* | (2006.01) | |
| *H04L 12/46* | (2006.01) | |
| *G06F 13/24* | (2006.01) | |
| *H04L 12/721* | (2013.01) | |
| *G06F 13/40* | (2006.01) | |

(52) U.S. Cl.
CPC ...... *G06F 13/4022* (2013.01); *G06F 13/4068* (2013.01); *G06F 21/85* (2013.01); *H04L 12/4633* (2013.01); *H04L 12/4641* (2013.01); *H04L 45/44* (2013.01); *H04L 49/351* (2013.01); *H04L 63/08* (2013.01); *G06F 2213/2424* (2013.01); *H04L 63/162* (2013.01)

(58) Field of Classification Search
CPC ............. G06F 21/85; G06F 2213/2424; H04L 12/4633; H04L 12/4641; H04L 45/44; H04L 49/351; H04L 63/08; H04L 63/162
See application file for complete search history.

(56) References Cited

U.S. PATENT DOCUMENTS

| | | | |
|---|---|---|---|
| 7,240,130 | B2 | 7/2007 | Larson et al. |
| 7,274,703 | B2 | 9/2007 | Weyman et al. |
| 7,299,277 | B1 | 11/2007 | Moran et al. |
| 7,466,922 | B2 | 12/2008 | Pierce et al. |
| 7,689,756 | B2 | 3/2010 | Ellison |
| 8,966,148 | B2 | 2/2015 | Campbell et al. |
| 8,984,201 | B2 | 3/2015 | Campbell et al. |
| 9,282,062 | B2 | 3/2016 | Campbell et al. |
| 9,654,421 | B2 | 5/2017 | Campbell et al. |
| 2002/0174207 | A1 | 11/2002 | Battou |
| 2005/0058149 | A1 | 3/2005 | Howe |
| 2006/0031482 | A1 | 2/2006 | Mohan et al. |
| 2008/0209099 | A1 | 8/2008 | Kloeppner et al. |
| 2008/0276027 | A1 | 11/2008 | Hagita |
| 2008/0304423 | A1 | 12/2008 | Chuang et al. |
| 2009/0323553 | A1 | 12/2009 | Hernandez et al. |
| 2009/0327572 | A1* | 12/2009 | Cho ................... G06F 13/4291 711/5 |
| 2010/0125653 | A1* | 5/2010 | Cherian ............. G06F 13/4004 709/223 |
| 2010/0185896 | A1 | 7/2010 | Andres et al. |
| 2011/0060974 | A1 | 3/2011 | Viger et al. |
| 2011/0069709 | A1 | 3/2011 | Morris et al. |
| 2011/0126278 | A1 | 5/2011 | Volpano |
| 2011/0321061 | A1 | 12/2011 | Craddock et al. |
| 2012/0008635 | A1 | 1/2012 | Kuo et al. |
| 2012/0096211 | A1 | 4/2012 | Davis et al. |
| 2012/0246346 | A1 | 9/2012 | Mach |
| 2013/0322264 | A1 | 12/2013 | Campbell et al. |
| 2013/0322290 | A1 | 12/2013 | Campbell et al. |
| 2014/0068317 | A1 | 3/2014 | Kanigicherla et al. |
| 2015/0139246 | A1 | 5/2015 | Campbell et al. |
| 2015/0146738 | A1 | 5/2015 | Campbell et al. |

OTHER PUBLICATIONS

Notice of Allowance from U.S. Appl. No. 14/606,966, dated Jan. 13, 2017.
Campbell et al., U.S. Appl. No. 14/606,966, filed Jan. 27, 2015.
Campbell et al., U.S. Appl. No. 14/606,982, filed Jan. 27, 2015.
Campbell et al., U.S. Appl. No. 13/487,082, filed Jun. 1, 2012.
Restriction Requirement from U.S. Appl. No. 13/487,082, dated Jan. 31, 2014.
Non-Final Office Action from U.S. Appl. No. 13/487,082, dated Jun. 9, 2014.
Notice of Allowance from U.S. Appl. No. 13/487,082, dated Oct. 14, 2014.
Campbell et al., U.S. Appl. No. 13/487,072, filed Jun. 1, 2012.
Non-Final Office Action from U.S. Appl. No. 13/487,072, dated Jun. 6, 2014.
Notice of Allowance from U.S. Appl. No. 13/487,072, dated Oct. 14, 2014.
Restriction Requirement from U.S. Appl. No. 13/487,072, dated Jan. 10, 2014.
Notice of Allowance from U.S. Appl. No. 14/606,982, dated Sep. 14, 2015.
Anonymous, "Establishing Deterministic Behavior of Processor Sub-System for Pulses on Level Sensitive Interrupt Lines," IP.com, IPCOM000211222D, Sep. 28, 2011, 8 pages.
IBM, "A Method to Improve Interrupting Efficiency for Ethernet Adapter," IP.com, IPCOM000141531 D, Oct. 8, 2006, pp. 1-3.
Oudjida et al., "FPGA Implementation of I2C & SPI Protocols: A Comparative Study," IEEE, Dec. 2009, pp. 507-510.
Non-Final Office Action from U.S. Appl. No. 14/606,966, dated Sep. 24, 2015.
Notice of Allowance from U.S. Appl. No. 14/606,982, dated Nov. 17, 2015.

* cited by examiner

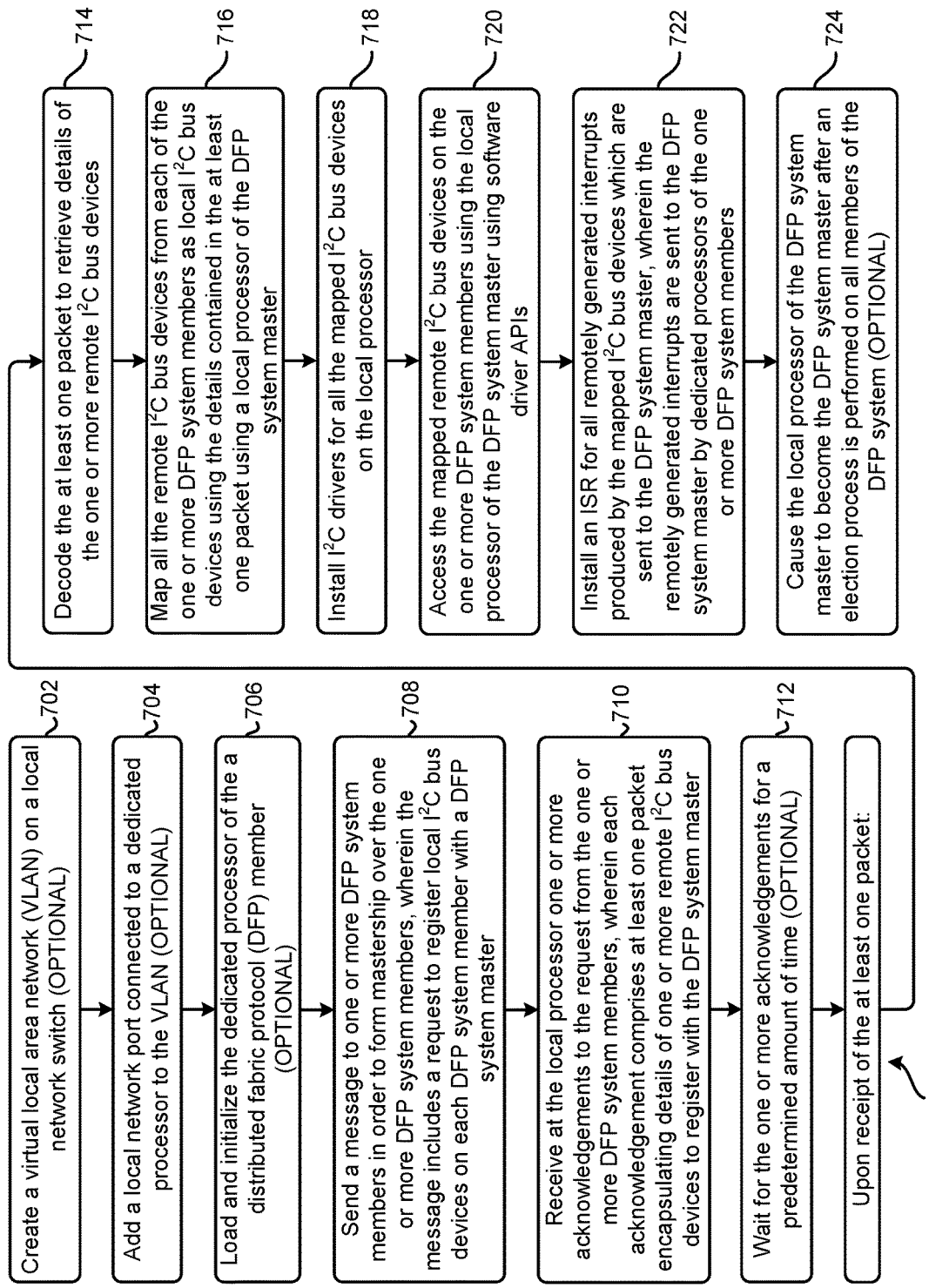

PROVIDING I²C BUS OVER ETHERNET

BACKGROUND

The present invention relates to Ethernet switches and switching, and more particularly, this invention relates to providing I²C bus over Ethernet.

A significant portion of network switches have various devices which utilize I²C bus as an interface to a local host external of the network switch or a local processor of the network switch, such as a central processing unit (CPU). Devices which communicate using an I²C bus will be referred to throughout this document as I²C bus devices. These I²C bus devices are typically controlled by the local processor over the I²C bus of the network switch. Some typical I²C bus devices include, but are not limited to, fan controllers, power supply units, various thermal gauges, serial electrically erasable programmable read only memory (SEEPROM) memories of various subunits, etc. In cell-based distributed fabric protocol (cDFP) and/or Ethernet-based distributed fabric protocol (eDFP) scaled out systems (referred to herein collectively as DFP systems), there are multiple individual system members which, in order to function properly, need to be controlled by the system master in real time. However, in conventional distributed systems or clusters, there is no way to provide real-time I²C bus over Ethernet.

SUMMARY

In one embodiment, a method includes receiving a request from a remote distributed fabric protocol (DFP) system master, using a dedicated processor of a DFP system member, to register local I²C devices on the DFP system member. The method also includes sending an acknowledgement to the request back to the DFP system master using the dedicated processor of the DFP system member. The acknowledgement includes a list of local I²C bus devices present on the DFP system member.

In another embodiment, a system includes a local processor, one or more local I²C bus devices, and a dedicated processor electrically coupled to the one or more local I²C bus devices. The dedicated processor is configured to route interrupts from the one or more local I²C bus devices to the local processor. The dedicated processor is also configured to expose the one or more local I²C devices to a remote DFP system master by sending details of the one or more local I²C bus devices to the remote DFP system master.

In yet another embodiment, a system includes a local processor, one or more local I²C bus devices, and a dedicated processor electrically coupled to the one or more local I²C bus devices. The dedicated processor is configured to receive a request from a remote DFP system master to register the one or more local I²C devices. The dedicated processor is also configured to send an acknowledgement to the request back to the DFP system master. The acknowledgement includes a list of the one or more local I²C bus devices.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a flowchart of a method, according to one embodiment.

DETAILED DESCRIPTION

Figure 1:
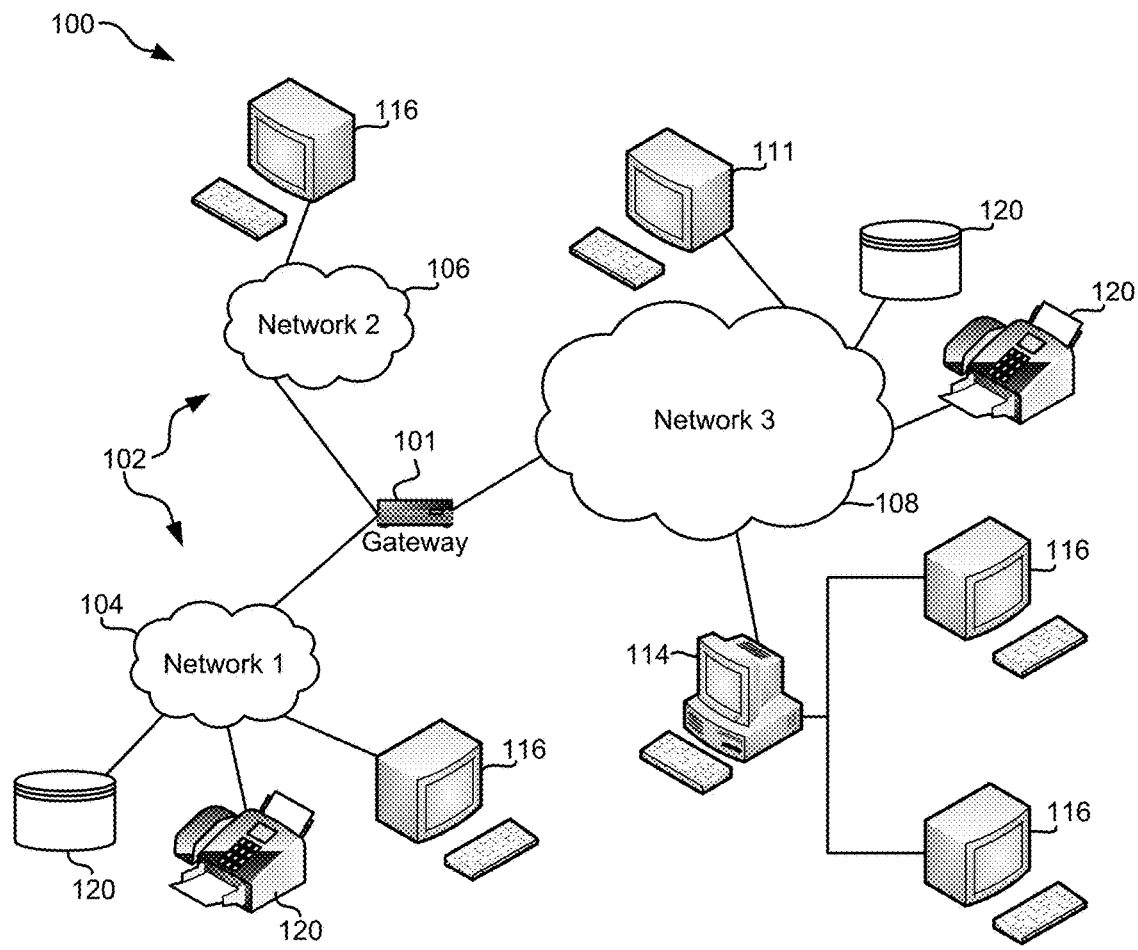
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, a system master of a distributed fabric protocol (DFP) system or cluster may be provided which has the capability to read the I²C bus devices of a remote member in order to enhance the DFP system or cluster functionality and the real time nature of the DFP, both of which enhance system usability. In some further embodiments, the system master may be capable of controlling one or more I²C bus devices of the member in order to converge control of the entire DFP system.

In one general embodiment, a system includes a local processor, a peripheral component interconnect express (PCIe) switch electrically coupled to the local processor, one or more local I²C bus devices, a dedicated processor electrically coupled to the one or more local I²C bus devices and the PCIe switch, and a local network switch electrically coupled to the dedicated processor and the PCIe switch, wherein the dedicated processor is adapted for routing interrupts from the one or more local I²C bus devices to the local processor, and wherein the local processor is adapted for handling the interrupts from the one or more local I²C bus devices.

In another general embodiment, a computer program product includes a computer readable storage medium having computer readable program code embodied therewith, the computer readable program code including computer readable program code configured to access every local I²C bus device using a local processor via a dedicated processor in order to ascertain which local I²C bus devices are present on a distributed fabric protocol (DFP) system member, computer readable program code configured to receive a request from a remote DFP system master to register local I²C devices on the DFP system member in order to allow access to the local I²C devices to be provided to the remote DFP system master, computer readable program code configured to send an acknowledgement to the request back to the remote DFP system master, wherein the acknowledgement includes a list of the local I²C bus devices and their particular offsets, computer readable program code configured to enable the local I²C bus devices to be networked, computer readable program code configured to receive a read request from the DFP system master to read at least one of the local I²C bus devices and authenticate the read request, computer readable program code configured to encapsulate details of the at least one of the local I²C bus devices into a same packet in which the read request was received, and computer readable program code configured to send the same packet in response to the authenticated read request to at least one registered media access control (MAC) address via a network port connected to the local network switch of the DFP system member to be switched to at least the DFP system master.

In yet another general embodiment, a computer program product includes a computer readable storage medium having computer readable program code embodied therewith, the computer readable program code including computer readable program code configured to send a message to one or more DFP system members in order to form mastership over the one or more DFP system members, wherein the message includes a request to register local I²C bus devices on each DFP system member with a DFP system master, computer readable program code configured to receive one or more acknowledgements to the request from the one or more DFP system members at a local network switch of the DFP system master, wherein each acknowledgement includes at least one packet encapsulating details of one or more local I²C bus devices to register with the remote DFP system master; upon receipt of the at least one packet: computer readable program code configured to decode the at least one packet to retrieve details of the one or more local I²C bus devices using a dedicated processor of the DFP system master, computer readable program code configured to map all the I²C bus devices from each of the one or more DFP system members using the details contained in the at least one packet using a local processor of the DFP system master, and computer readable program code configured to access the registered I²C bus devices on the one or more DFP system members using the local processor of the DFP system master.

In another general embodiment, a method includes accessing every local I²C bus device using a local processor via a dedicated processor in order to ascertain which local I²C bus devices are present on a DFP system member, receiving a request from a remote DFP system master to register local I²C devices on the DFP system member in order to allow access to the local I²C devices to be provided to the DFP system master, sending an acknowledgement to the request back to the DFP system master, wherein the acknowledgement includes a list of the local I²C bus devices and their particular offsets, enabling the local I²C bus devices to be networked, receiving a read request from the DFP system master to read at least one of the local I²C bus devices and authenticating the read request, encapsulating details of the at least one of the local I²C bus devices into a same packet in which the read request was received, and sending the same packet in response to the authenticated read request to at least one registered MAC address via a network port connected to the local network switch of the DFP system member to be switched to at least the DFP system master.

According to yet another general embodiment, a method includes sending a message to one or more DFP system members in order to form mastership over the one or more DFP system members, wherein the message includes a request to register I²C bus devices on each DFP system member (remote I²C bus devices) with a DFP system master, receiving one or more acknowledgements to the request from the one or more DFP system members at a local network switch of the DFP system master, wherein each acknowledgement includes at least one packet encapsulating details of one or more remote I²C bus devices to register with the DFP system master; upon receipt of the at least one packet: decoding the at least one packet to retrieve details of the one or more remote I²C bus devices using a dedicated processor of the DFP system master, mapping all the remote I²C bus devices from each of the one or more DFP system members as local I²C bus devices using the details contained in the at least one packet using a local processor of the DFP system master, installing I²C drivers for all the mapped I²C bus devices on the local processor, accessing the mapped I²C bus devices on the one or more DFP system members using the local processor of the DFP system master using software driver application programming interfaces (APIs), and installing an interrupt service routine (ISR) for all remotely generated interrupts produced by the mapped I²C bus devices which are sent to the DFP system master, wherein the remotely generated interrupts are sent to the DFP system master by dedicated processors of the one or more DFP system members.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX system which virtually hosts a MICROSOFT® WINDOWS® environment, a MICROSOFT WINDOWS system which emulates an IBM z/OS environment, etc. This virtualization and/or emulation may be enhanced through the use of VMWARE® software, in some embodiments. IBM and z/OS are trademarks of International Business Machines Corporation in the United States and other countries. UNIX is a registered trademark of The Open Group in the United States and other countries. Microsoft and Windows are trademarks of Microsoft Corporation in the United States other countries or both.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
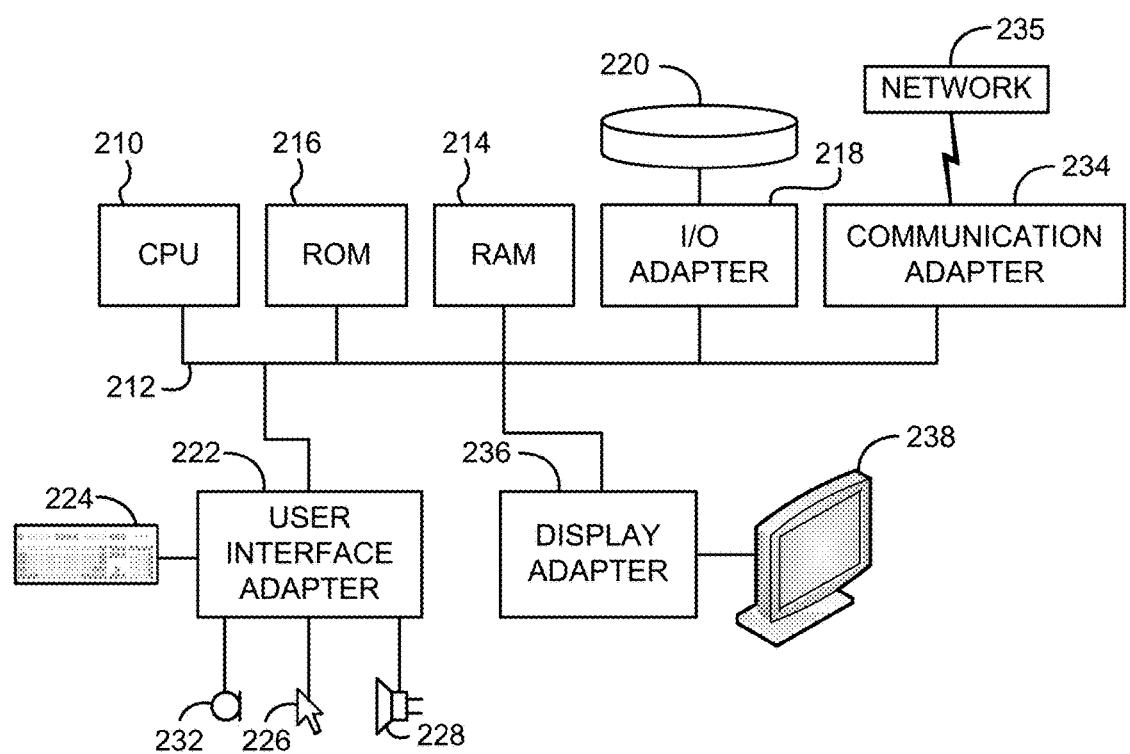
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC® OS, a UNIX OS, etc. It will be appreciated that a preferred embodiment may also be implemented on platforms and operating systems other than those mentioned. A preferred embodiment may be written using JAVA®, XML, C, and/or C++ language, or other programming languages, along with an object oriented programming methodology. Object oriented programming (OOP), which has become increasingly used to develop complex applications, may be used. MAC is a registered trademark of Apple Inc. Oracle and JAVA are registered trademarks of Oracle and/or its affiliates. Other names may be trademarks of their respective owners.

Figure 3:
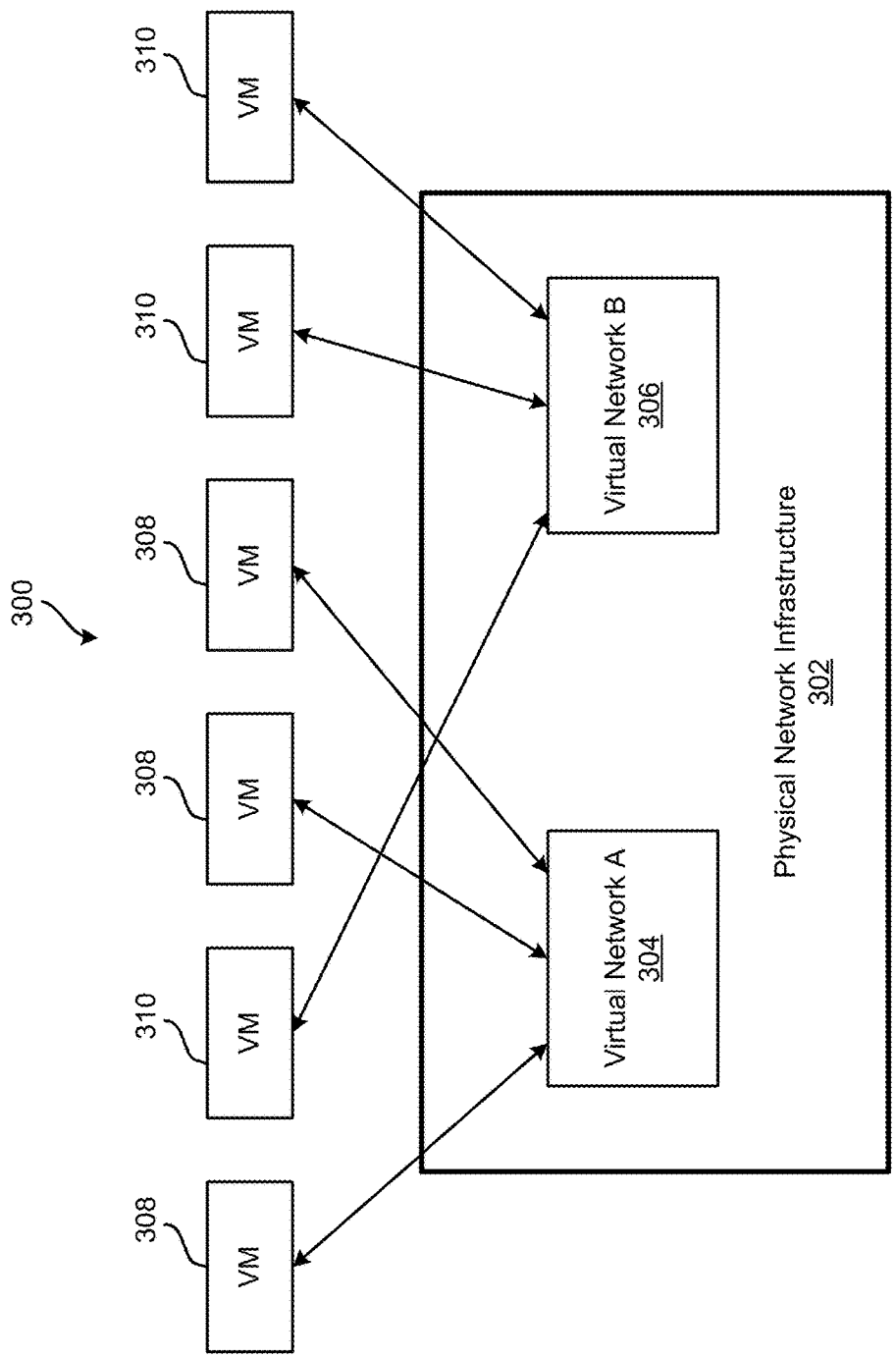
FIG. 3 is a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, a cell-based distributed Fabric Protocol (cDFP) system and/or an Ethernet-based distributed Fabric Protocol (eDFP) system may be virtualized. The overlay network 300, in one approach, comprises one or more virtual networks 304, 306 within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc.

Each virtual network 304, 306 may include any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time, but this is certainly not required nor intended to be limiting.

Figure 4:
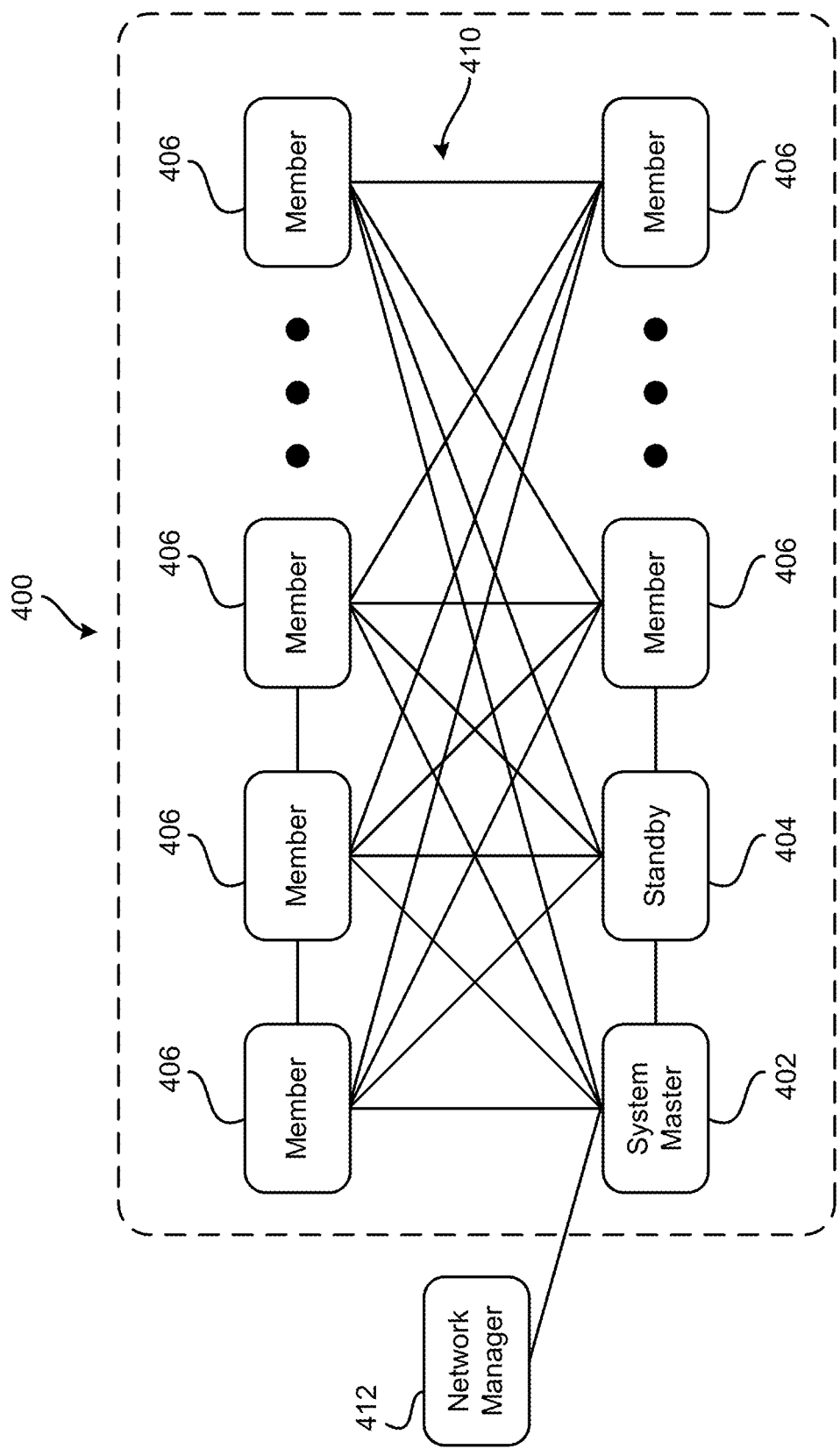
FIG. 4 shows an overview of component connectivity of a cDFP and/or an eDFP, according to one embodiment.

Now referring to FIG. 4, an overview of component connectivity 410 of a cDFP and/or a eDFP (DFP 400) is shown according to one embodiment. The system master 402 is a main controller of the DFP 400. In one embodiment, no other controller may be used in the domain of the DFP 400. In alternate embodiments, other controllers (not shown) may be used to control specific or general functionality of the domain, such as switching, testing, etc. Traffic (data/requests/alerts or the like being sent) from outside of the domain enters the DFP 400 through network manager 412.

The standby device 404 is provided in the DFP 400 so that should connectivity to the system master 402 be lost for any reason, or if the system master 402 fails for any reason, the standby device 404 is adapted to become the system master and provides all functionality of a system master.

The system master 402 is responsible for determining services used for a particular traffic flow (movement of data/requests/alerts or the like through the DFP 400) and redirects it through a series of members 406, as appropriate based on the particular traffic flow involved, as would be understood by one of skill in the art.

In one embodiment, the topology of the DFP 400, being a cell switched Clos, provides high availability of any links/devices on the DFP 400. Connectivity details and cross-sectional bandwidth may be implementation specific and may be determined on an application specific basis, as would be understood by one of skill in the art.

From a networking perspective, the entire domain of the DFP 400 from outside may appear like an end host, where some services are being applied to traffic flows. The backplane of the topology, being a cell switched interface as described before, removes the possibility of endless looping and it efficiently uses the available backplane bandwidth by spreading cells over multiple links for a single destination, according to one embodiment. Individual members 406 may be added/removed in the domain of the DFP 400 without disrupting other services, devices, etc.

According to one embodiment, up to about 800 members may be grouped together in the DFP 400. This allows for about 32,768 Ethernet ports in a single domain of a DFP 400, in one example. In a further embodiment, with the architecture described herein according to various embodiments, constant latency of about 2.5 microseconds or less is possible along with the large number of Ethernet ports possible in one traffic management domain. In one example, the DFP 400 may be envisioned as a single switch having over 32,000 Ethernet ports.

Accordingly, in addition to integrating the plurality of Ethernet ports into the DFP 400, all of the requirements of a data center are also integrated into the DFP 400, in some embodiments. Therefore, if a new extremely low latency, flat data center is being initiated, the DFP 400 helps with virtualization, because most of the virtualized data centers, especially hypervisor-based servers, run a plurality of VMs. By having a "flat switch" architecture, the plurality of VMs may move data across the architecture easily and efficiently. It is very difficult for VMs, generally, to move across layer 3-domains, between one subnet to another subnet, internet protocol (IP) subnet to IP subnet, etc. But if the architecture is similar to a large flat switch, in a very large layer 2-domain, then the VMs are aided in their attempt to move data across the architecture.

According to one embodiment, a dedicated processor, which may be a field programmable gate array (FPGA), is provided on each member of the DFP system. The dedicated processor may be adapted for collecting all necessary local interrupts (e.g., local interrupts that may require immediate attention, which may be determined by the dedicated processor or may be programmed by a user) from various local interrupt sources (e.g., on the hardware board) and connecting all the I$^2$C bus devices together, including a local processor, such as a central processing unit (CPU) or host. The dedicated processor has complete visibility into all the local I$^2$C bus devices. The system master local processor is adapted for sending I$^2$C read/write requests to the dedicated processor over Ethernet. These requests may be encapsulated in enhanced layer 2 transport (EL2T) protocol packets. On receiving these I$^2$C requests on the EL2T protocol from the system master, the dedicated processor performs a corresponding action and replies back using the same EL2T packet which is sent back to the system master. A more detailed description of this system and functionality is presented below according to various embodiments.

Figure 5:
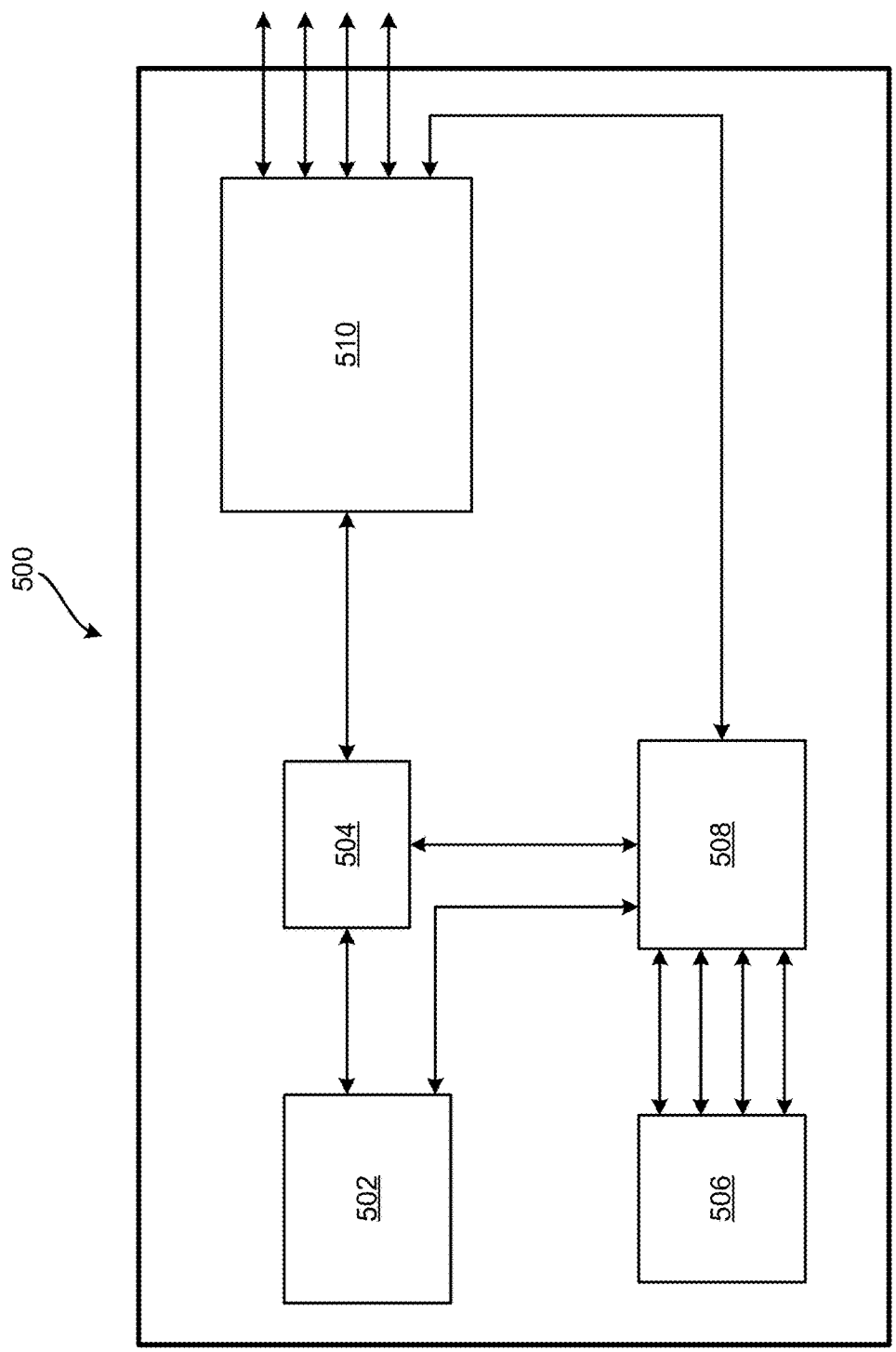
FIG. 5 is a simplified system block diagram, according to one embodiment.

With reference to FIG. 5, a block diagram of a system 500 is shown according to one embodiment. The system 500 may be a system master, a DFP system member, or a standby, according to various embodiments. Of course, other components, modules, logic, circuits, etc., that are not specifically shown in FIG. 5 may be included in the system 500 in various approaches, such as a fan, a fan controller, a motherboard, wiring, interconnects, a power supply, etc.

A system master typically controls a DFP system, while DFP system members receive instructions from the system master and comply with instructions/requests from the system master. The standby operates like a member, until communication is lost with the system master for some reason, in which case the standby becomes the system master and functions accordingly.

The system 500 comprises a local processor 502, a PCIe switch 504, one or more local I²C bus devices 506, a dedicated processor 508, and a local network switch 510, according to one embodiment. Each component of the system 500 is described in more detail below.

The local processor 502 is electrically coupled to the PCIe switch 504 and the dedicated processor 508, in some approaches, and may comprise one or more of any of the following: a central processing unit (CPU), an integrated circuit (IC), a field programmable gate array (FPGA), an application specific integrated circuit (ASIC), a microcontroller, or any other suitable processor. In one embodiment, the local processor 502 may be a local CPU adapted for controlling operations of the system 500 including handling one or more local interrupts produced by the one or more local I²C bus devices 506 along with controlling operations of the local I²C bus devices 506.

In another embodiment, the local processor 502 may have the functionality of controlling the local I²C bus devices 506 suspended and/or removed such that only a system master of the DFP system is capable of controlling the local I²C bus devices 506.

The PCIe switch 504 is electrically coupled to the local processor 502, the dedicated processor 508, and the local network switch 510, in one approach. The components may be interconnected using any suitable connectors as known in the art. The connection to the dedicated processor 508 may rely on the MSI protocol, MESI protocol, MOSI protocol, or some other suitable communication protocol, according to various embodiments. Communications between the dedicated processor 508 and the local network switch 510, and/or communications between the local processor 502 and the dedicated processor 508 may occur via MSI messages. Of course, communications between any other components of the system 500 may occur via MSI as well, in some approaches.

The PCIe switch 504 may comprise any suitable switch device and/or processor known in the art. In addition, the PCIe switch 504 may be adapted for switching protocols and devices beyond just PCIe-based protocols and devices, as any known communication protocol may be switched by the PCIe switch according to various embodiments.

In one approach, the PCIe switch 504 may comprise multiple PCIe bus connections that serve one or more PCIe buses.

The one or more local I²C bus devices 506 may include any device, module, component, and/or logic that may communicate over the I²C bus. Furthermore, any of these local I²C bus devices may produce or create one or more interrupts indicating an exception to normal operation. Some interrupts need to be dealt with immediately, while some interrupts may be disregarded and/or are for notification purposes only. The interrupts that need to be dealt with immediately or as soon as possible should be dealt with by the local processor 502 in order to manage the system 500 effectively, according to conventional systems.

However, according to embodiments described herein where the system 500 is a DFP system member, these interrupts may be sent to a remote DFP system master, which is adapted to handle these interrupts and/or control the local I²C bus devices 506 from the remote location of the DFP system master.

Some examples of local I²C bus devices 506 include a fan or fan controller, a power supply unit, a temperature indicator or logic interpreting the temperature indicator, etc. The one or more interrupts which are provided by the local I²C bus devices 506 may be routed by the dedicated processor 508 to the local processor 502 to be dealt with, in one embodiment, when the system 500 is a remote DFP system master or is a DFP system member and is disconnected from a remote DFP system master in some capacity. In another embodiment, when the system 500 is a DFP system member and is connected to the remote DFP system master, these interrupts may be sent to the remote DFP system master to be dealt with.

Some of the local I²C bus devices 506 may provide interrupts directly to the local processor 502 via hard coding, some may provide interrupts via I²C protocol, etc., according to various embodiments. However, each interrupt which is provided may be routed to the dedicated processor 508 in order to be routed to an external device, such as a remote DFP system master, in one approach.

The dedicated processor 508 may be electrically coupled to the PCIe switch 504 and to the local network switch 510. The components may be interconnected using any suitable connectors known in the art. Also, the local I²C bus devices 506 may be electrically coupled to the dedicated processor 508 such that the dedicated processor 508 is capable of receiving interrupts from the local I²C bus devices 506 and/or control the local I²C bus devices 506 either directly, or via commands from a remote DFP system master, commands from the local processor 502, etc., according to various embodiments.

The dedicated processor 508, which is typically not provided in conventional switches, is adapted for collecting interrupts from the local I²C bus devices 506. Also, it is adapted for generating one or more interrupts to the local processor 502 based on the interrupts received from the local I²C bus devices 506 and creating multicast or unicast packets, such as EL2T packets, encapsulating details of the interrupts to be sent to an external device, such as a remote DFP system master, in one approach. These packets are then sent to the local network switch 510 where they can be switched out to the remote DFP system master. The dedicated processor 508 may comprise any suitable processor known in the art, such as a CPU, an IC, an ASIC, a microcontroller, and/or a FPGA.

According to one embodiment, when the system 500 is a DFP system member, the dedicated processor 508 may be adapted for: accessing every local I²C bus device 506 using the local processor 502 in order to ascertain which local I²C bus devices 506 are present on the DFP system member; receiving a request from a remote DFP system master to register the local I²C devices 506 in order to allow access to the local I²C devices 506 to be provided to the remote DFP system master; sending an acknowledgement to the request back to the remote DFP system master, wherein the acknowledgement includes a list of the local I²C bus devices 506 and their particular offsets, as would be understood by one of skill in the art; enabling the local I²C bus devices 506 to be networked; receiving a read request from the remote DFP system master to read at least one of the local I²C bus devices 506 and authenticating the read request; encapsulating details of the at least one of the local I²C bus devices 506 into a same packet in which the read request was received; and sending the same packet in response to the authenticated read request to at least one registered media access control (MAC) address via a network port connected to the local network switch 510 to be switched to at least the remote DFP system master.

In addition, in one embodiment, the dedicated processor 508 may be adapted for packaging the local interrupts and sending the packaged interrupts to the local network switch 510. Furthermore, the dedicated processor 508 may be a FPGA and the packets may be EL2T protocol packets. Of course, other protocols may be used for encapsulating the details of the local interrupts received from the local I$^2$C bus devices 506.

Details of the local interrupts may include, but are not limited to, the switch ID of the DFP system member, the interrupt source (e.g., which local I$^2$C bus device 506 created the interrupt), the interrupt type, the interrupt priority, among other details not specifically mentioned but would be understood by one of skill in the art upon reading the present descriptions.

The local network switch 510 is electrically coupled to the PCIe switch 504 and the dedicated processor 508. The components may be interconnected using any suitable connectors as known in the art. The local network switch 510 may switch any communication protocol, including, but not limited to, Ethernet, PCIe, PCIe-over-Ethernet, Fabric, Fibre Channel (FC), Fibre Channel-over-Ethernet (FCoE), etc. The connection between the dedicated processor 508 and the local network switch 510 may be a local network port (which would constitute an independent VLAN), according to one approach. Of course, depending on the type of network switch, some other connection known in the art may be used in more approaches.

In one embodiment, the local network switch 510 may comprise an ASIC, such as a packet switching ASIC (e.g., a BROADCOM model BCM88650) or some other suitable packet switching processor, in various embodiments.

The local network switch 510 is adapted for receiving data, information, and/or packets from internal components (e.g., the dedicated processor 508, the PCIe switch 504, etc.) to be sent out to devices outside of the system 500. Also, it is adapted for sending these packets to the devices outside of the system 500 and for receiving packets from the devices outside of the system 500. The local network switch 510 is then adapted for sending these received packets from outside of the system 500 to the proper internal components (e.g., the dedicated processor 508, the PCIe switch 504, etc.).

The local network switch 510 may be adapted for receiving internal packets from the dedicated processor 508 and/or the PCIe switch 504 to be sent outside of the system 500 and sending the internal packets to an external device, and receiving external packets from the external device and sending the external packets to the dedicated processor 508 and/or the PCIe switch 504, according to one embodiment.

If a problem arises in the communication of the local interrupts to the dedicated processor 508, to the local network switch 510, or anywhere else in the network, as explained in more detail later, the local interrupts may be sent to the local processor 502, or via the dedicated processor 508 via the PCIe switch 504, in other approaches, so that the local processor 502 may interpret the interrupts and handle the interrupts. In one approach, the local processor may read the interrupt details to determine how to react to the interrupt to return to normal operation, and may perform one or more tasks in order to handle the interrupt, such as starting or stopping a component or operation, altering conditions, alerting a user to a situation, etc.

Furthermore, the local processor 502 may be capable of handling, controlling, or otherwise managing the local I$^2$C bus devices 506 in case of a loss of communications with the remote DFP system master, in some approaches.

In another embodiment, when the system 500 is a standby or member of a DFP system, the local network switch 510 may be adapted for sending multicast or unicast packets encapsulating details of the one or more local interrupts to a remote DFP system master. In addition, the local network switch 510 may be adapted for receiving commands, instructions, and/or requests from the remote DFP system master and forwarding these messages to an appropriate recipient, such as the dedicated processor 508, the PCIe switch 504, etc.

According to another embodiment, when the system 500 is a remote DFP system master, the local processor 502 may be a CPU adapted for controlling operations of the system 500 including handling the local interrupts from the local I$^2$C bus devices 506 and for analyzing and responding to remote interrupts, packages, messages (received through the local network switch 510) and/or details of remote I$^2$C bus devices on DFP system members external of the system 500.

Furthermore, the dedicated processor 508 may be adapted for generating one or more interrupts to the local processor 502 based on the one or more local interrupts received from the local I$^2$C bus devices 506 (to manage its own system), receiving multicast or unicast packets encapsulating details of remote interrupts from remote I$^2$C bus devices (from DFP system members) via the local network switch 510, and decoding the multicast or unicast packets to determine details of the external interrupts and remote I$^2$C bus devices, in some approaches. In addition, in some approaches, the local network switch 510 may be a packet switching ASIC and may be adapted for receiving the multicast or unicast packets encapsulating details of the external interrupts and remote I$^2$C bus devices from one or more DFP system members.

In another embodiment, where the system 500 is a DFP system master, the dedicated processor 508 may be adapted for receiving multicast or unicast EL2T protocol packets encapsulating details of external interrupts (from DFP system members) and remote I$^2$C bus devices through the local network switch 510, the dedicated processor 508 may be adapted for decoding the multicast or unicast EL2T packets to determine details of the external interrupts and remote I$^2$C bus devices encapsulated in the multicast or unicast EL2T packets, the dedicated processor 508 may be adapted for sending an MSI-based message to the local processor 502 including details of the external interrupts and remote I$^2$C bus devices, the local network switch 510 may be adapted for receiving the multicast or unicast EL2T packets encapsulating details of the external interrupts and remote I$^2$C bus devices from one or more DFP system members, and the local processor 502 may be adapted for reading and responding to the external interrupts and/or controlling the remote I$^2$C bus devices from one or more DFP system members.

As mentioned earlier, the block diagram shown in FIG. 5 applies equally to member systems, standby systems, and system masters, according to various embodiments. Next, descriptions are provided of logic and functionality that may occur on members, standbys, and system masters, according to various embodiments.

Figure 6:
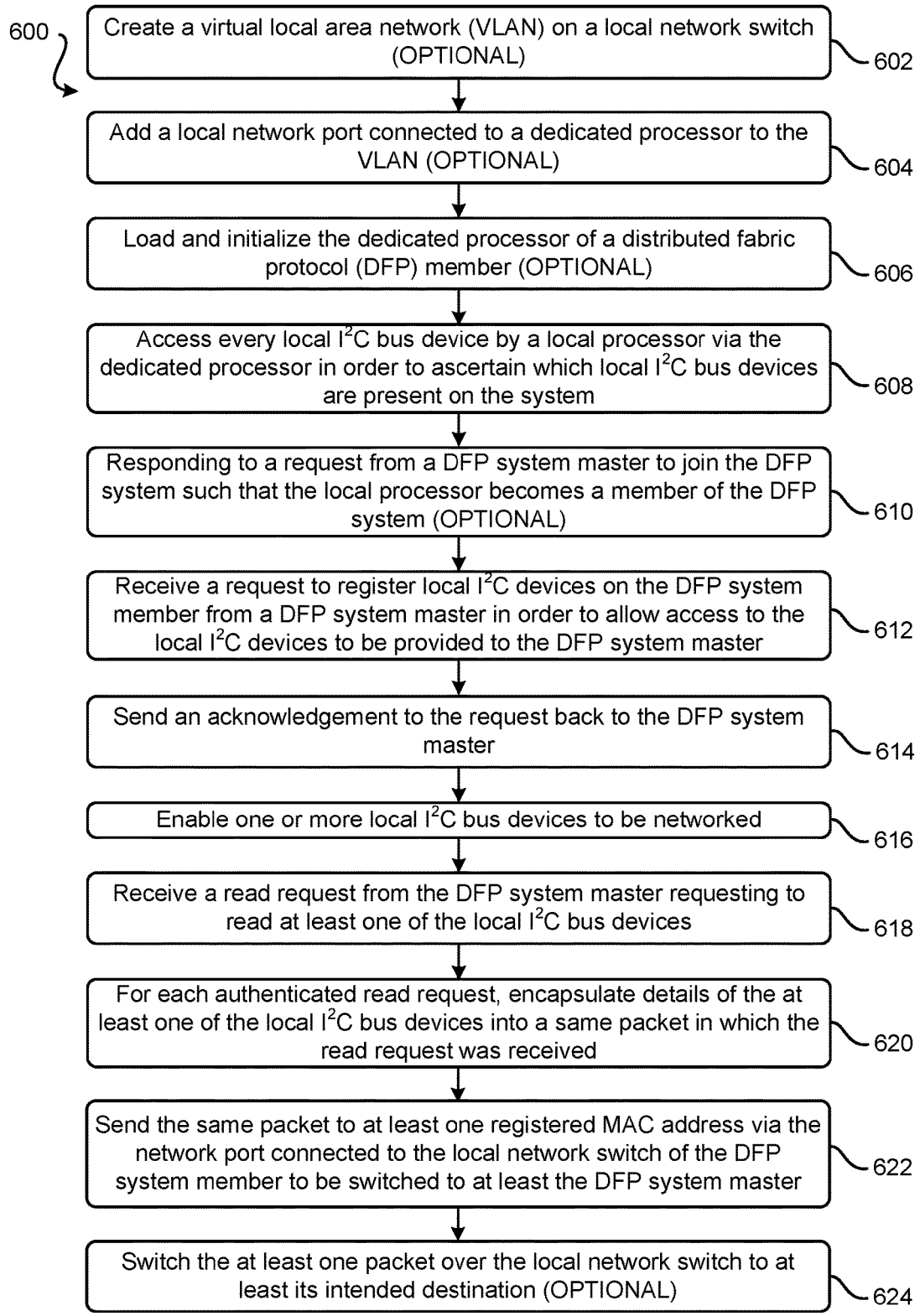
FIG. 6 is a flowchart of a method, according to one embodiment.

Now referring to FIG. 6, a flowchart of a method 600 is shown, according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a member of a DFP system, in one approach, as described herein in more detail.

Optional operations described below are those operations which may be omitted, or may be performed once while other operations are performed multiple times, or may be performed by other entities are systems and relied upon by other operations, according to various embodiments.

As shown in FIG. 6, method 600 may initiate with optional operation 602, where a VLAN is created on a local network switch, in one approach. Any suitable VLAN may be created, such as VLAN 4095, VLAN 4096, or some other predefined VLAN ID.

In one embodiment, the local network switch may be a packet switching ASIC, such as a BROADCOM BCM88650 or some other suitable processor.

In optional operation 604, a local network port connected to a dedicated processor (such as a dedicated processor of the DFP system member) is added to the VLAN.

In one approach, the dedicated processor may be a FPGA adapted for at least performing the functionality described for the dedicated processor in method 600.

In optional operation 606, the dedicated processor (such as a dedicated processor of the DFP system member) is loaded and initialized. Of course, any other associated actions, as would be understood by one of skill in the art upon reading the present descriptions, may be performed along with the loading and initializing.

In a further embodiment, optional operations 602-606 may be performed at system boot up of a DFP system member comprising the local network switch.

In operation 608, every local I$^2$C bus device is accessed by a local processor via the dedicated processor in order to ascertain which local I$^2$C bus devices are present on the system. If this has already been performed and the system is aware of all local I$^2$C bus devices then operation 608 may be omitted.

According to one embodiment, the local processor may be a CPU. Since all local I$^2$C bus devices are routed through the dedicated processor, the local processor must access the local I$^2$C bus devices via the dedicated processor.

In optional operation 610, the local processor becomes a member of a DFP system by responding to a request from a remote DFP system master to join the DFP system. Of course, if the system is already a DFP system member, then operation 610 may be omitted. In most approaches, the local processor and all components of the system become a member of a DFP system after responding to the request.

In operation 612, a request to register local I$^2$C devices on the DFP system member is received from a DFP system master in order to allow access to the local I$^2$C devices to be provided to the DFP system master. The request may be unicast or multicast.

In operation 614, an acknowledgement to the request is sent, such as back to the DFP system master. The acknowledgement may include information, such as identifying information, location information, etc. Furthermore, the acknowledgement may be sent by the dedicated processor, in one approach.

In one approach, the acknowledgment may include a list of local I$^2$C bus devices and their particular offsets.

In operation 616, one or more local I$^2$C bus devices are enabled to be networked (via MSI to the local network switch). This may be performed by the dedicated processor of the DFP system member, in one approach, or any other suitable component, device, and/or logic.

The source MAC address of each local I$^2$C bus device may be maintained by the dedicated processor.

In operation 618, a read request from the DFP system master is received requesting to read at least one of the local I$^2$C bus devices. Furthermore, the read request is authenticated after receipt of the request, in one approach.

In operation 620, for each authenticated read request, details of the at least one of the local I$^2$C bus devices are encapsulated into a same packet in which the read request was received. The packet, such as an EL2T packet or some other suitable communication packet type, may be reused from the read request, and details of the local I$^2$C bus devices are stored in a payload of the packet, in one embodiment. Also included in the payload is a switch ID of the DFP system member in the DFP system. The DFP system member switch ID may be preprogrammed in the DFP system member, decided by and provided by the DFP system master, etc.

In more approaches, details that may be stored to the packet include, but are not limited to, the switch ID of the DFP system member, the local I$^2$C bus device source, the interrupt type, and/or the interrupt priority, among other details not specifically mentioned but would be understood by one of skill in the art upon reading the present descriptions.

In operation 622, the same packet, such as the same EL2T packet used in the request, is sent to at least one registered media access control (MAC) address via the network port connected to the local network switch of the DFP system member to be switched to at least the DFP system master. This sending may be performed by the dedicated processor, in one approach, or some other suitable device, logic, etc. This EL2T packet may be sent via MSI, in one approach, or some other suitable communication protocol.

In optional operation 624, the at least one packet, such as the same EL2T packet that was received in the authenticated read request, may be switched, such as over the local network switch as per a layer 2 unicast forwarding database, to at least its intended destination (e.g., the remote DFP system master). Of course, other switching actions may be performed, such as multicast switching, and switching to multiple destinations, such as in response to multiple authenticated read requests.

In one approach, a message signaled interrupt (MSI) may be simultaneously sent to the local processor over a PCIe bus connected to the local PCIe switch, if it is deemed to be required in order to process the interrupt.

In one embodiment, the at least one packet may be switched to at least the DFP system master using the local network switch.

According to several embodiments, the method 600 may be performed using a dedicated processor of the DFP system member, the dedicated processor may be a FPGA, and/or the at least one packet may be an EL2T protocol packet.

In another embodiment, the at least one packet may include a switch ID of the DFP system member, and an interrupt source (the local I$^2$C bus device), an interrupt type, and/or an interrupt priority for each of the one or more local I$^2$C bus devices. Of course, it may include more details/information than that specifically described herein, as would be understood by one of skill in the art upon reading the present descriptions.

The I²C device information may be sent to multiple MAC addresses, one at a time, according to one embodiment. The information may, in an alternative embodiment, be sent to one unique multicast MAC address if multicast is preferred.

According to various embodiments, the method 600 may be performed by a system, computer, or some other device capable of executing commands, logic, etc.

In one such embodiment, a computer program product for handling local interrupts comprises a computer readable storage medium having computer readable program code embodied therewith. The computer readable program code comprises: computer readable program code configured to access every local I²C bus device using a local processor via a dedicated processor in order to ascertain which local I²C bus devices are present on a DFP system member; computer readable program code configured to receive a request from a DFP system master to register local I²C devices on the DFP system member in order to allow access to the local I²C devices to be provided to the DFP system master; computer readable program code configured to send an acknowledgement to the request back to the DFP system master, wherein the acknowledgement includes a list of the local I²C bus devices and their particular offsets; computer readable program code configured to enable the local I²C bus devices to be networked; computer readable program code configured to receive a read request from the DFP system master to read at least one of the local I²C bus devices and authenticate the read request; computer readable program code configured to encapsulate details of the at least one of the local I²C bus devices into a same packet in which the read request was received; and computer readable program code configured to send the same packet in response to the authenticated read request to at least one registered MAC address via a network port connected to the local network switch of the DFP system member to be switched to at least the DFP system master.

In a further embodiment, the computer program product may further comprise computer readable program code configured to cause the local processor to become a member of a DFP system by responding to a request from the DFP system master to join the DFP system; computer readable program code configured to create a VLAN on the local network switch; computer readable program code configured to add a local network port connected to the dedicated processor to the VLAN; computer readable program code configured to load and initialize a dedicated processor of the DFP system member upon start up of the DFP system member; and computer readable program code configured to receive a request at the local network switch of the DFP system member to become a member of the DFP system.

Now referring to FIG. 7, a flowchart of a method 700 is shown, according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a DFP system master, in one approach, as described in detail herein.

Optional operations described below are those operations which may be omitted, or may be performed once while other operations are performed multiple times, or may be performed by other entities are systems and relied upon by other operations, according to various embodiments.

As shown in FIG. 7, method 700 may initiate with optional operation 702, where a VLAN is created on a local network switch (such as of the DFP system master), in one approach. Any suitable VLAN may be created, such as VLAN 4095, VLAN 4096, or some other predefined VLAN ID.

In one embodiment, the local network switch may be a packet switching ASIC. In a further embodiment, optional operation 702 may be performed at system boot up of a DFP system master comprising the local network switch.

In optional operation 704, a local network port connected to a dedicated processor (such as of the DFP system master) is added to the VLAN. This functionality may be accomplished using the local network switch or any other suitable device.

In one approach, the dedicated processor may be a FPGA adapted for at least performing the functionality described for the dedicated processor in method 700.

In optional operation 706, the dedicated processor is loaded and initialized, along with any other associated actions, as would be understood by one of skill in the art upon reading the present descriptions.

These operations 702-706 may be performed upon boot up of the DFP system master, in some approaches.

In operation 708, a message is sent to one or more DFP system members in order to form mastership over the one or more DFP system members, wherein the message includes a request to register local I²C bus devices on each DFP system member with a DFP system master. In some approaches, the message may be initiated by a local processor or a dedicated processor of the DFP system master. The local processor and/or the dedicated processor may comprise one or more of any of the following: a CPU, an IC, a FPGA, an ASIC, etc.

In another embodiment, each DFP system member may determine whether to respond to the message and/or which local I²C bus devices to send details of back to the DFP system master.

In another embodiment, the request may be a multicast EL2T packet which includes a request for various local (remote to the DFP system master) I²C bus devices.

In operation 710, the local processor receives one or more acknowledgements to the request from the one or more DFP system members (such as via a local network switch of the DFP system master), wherein each acknowledgement comprises at least one packet encapsulating details of one or more remote I²C bus devices to register with the DFP system master.

In one embodiment, each acknowledgement may include a packet, such as an EL2T packet, which includes details about one or more remote I²C bus devices for the DFP system member which sent the acknowledgement.

In optional operation 712, the one or more acknowledgements may be waited on for a predetermined amount of time, for a certain period of time after a last acknowledgement is received, etc. Once that time period has passed, it may be considered that all acknowledgements have been received.

According to one embodiment, the one or more acknowledgements may be sent from DFP system members of the DFP system for which the DFP system master is a master.

In operation 714, when a packet is received (e.g., upon receipt of the at least one packet), the at least one packet is decoded to retrieve details of the one or more remote I²C bus devices. In one approach, the dedicated processor (such as of the DFP system master) may perform the decoding.

According to some approaches, the details that may be included in the packet include, but are not limited to, the switch ID of the DFP system member, a particular offset for each remote I²C bus device, among other details not specifically mentioned but would be understood by one of skill in the art upon reading the present descriptions.

In operation 716, all the remote I²C bus devices from each of the one or more DFP system members are mapped as local I²C bus devices using the details contained in the at least one packet using a local processor of the DFP system master.

In operation 718, I²C drivers for all the mapped I²C bus devices are installed on the local processor.

In operation 720, the mapped I²C bus devices are accessed on the one or more DFP system members using the local processor of the DFP system master using software driver application programming interfaces (APIs). This may be performed to identify interrupts produced by the mapped remote I²C bus devices and/or to control operations of the mapped remote I²C bus devices. This alleviates some of the burden of processing from each of the DFP system members, allowing them to more effectively perform other switching functions for which they are purposed.

In operation 722, an interrupt service routine (ISR) is installed for all remotely generated interrupts produced by the mapped I²C bus devices which are sent to the DFP system master. The remotely generated interrupts are sent to the DFP system master by dedicated processors of the one or more DFP system members, in one approach.

In optional operation 724, the local processor of the DFP system master is caused to become the DFP system master after an election process is performed on all members of the DFP system. The election process may determine which of a plurality of systems will act as the system master and which will act as a standby, with the remaining system relegated as members of the system, in one approach.

In one embodiment, the one or more DFP system members may send EL2T packets encapsulating interrupt details to the dedicated processor of the DFP system master and may simultaneously send PCIe MSI to a local processor of the one or more DFP system members. In addition, upon receipt of the interrupt encapsulated EL2T packet, the dedicated processor of the DFP system master may generate a PCIe MSI to the local processor of the DFP system master, and the local processor of the DFP system master may invoke an ISR to service the MSI.

According to various embodiments, the method 700 may be performed by a system, computer, or some other device capable of executing commands, logic, etc.

In one such embodiment, a computer program product comprises a computer readable storage medium having computer readable program code embodied therewith. The computer readable program code comprises: computer readable program code configured to send a message to one or more DFP system members in order to form mastership over the one or more DFP system members, wherein the message includes a request to register local I²C bus devices on each DFP system member with a DFP system master; computer readable program code configured to receive one or more acknowledgements to the request from the one or more DFP system members at a local network switch of the DFP system master, wherein each acknowledgement comprises at least one packet encapsulating details of one or more local I²C bus devices to register with the DFP system master; and upon receipt of the at least one packet: computer readable program code configured to decode the at least one packet to retrieve details of the one or more local I²C bus devices using a dedicated processor of the DFP system master; computer readable program code configured to map all the I²C bus devices from each of the one or more DFP system members using the details contained in the at least one packet using a local processor of the DFP system master; and computer readable program code configured to access the registered I²C bus devices on the one or more DFP system members using the local processor of the DFP system master.

In a further embodiment, the computer program product may further comprise: computer readable program code configured to create a VLAN on the local network switch; computer readable program code configured to add a local network port connected to the dedicated processor to the VLAN; computer readable program code configured to load and initialize the dedicated processor of the DFP system master upon start up of the DFP system master; computer readable program code configured to wait for a predetermined amount of time for the one or more acknowledgements; and computer readable program code configured to cause a local processor of the DFP system master to become the DFP system master after election process performed on all members of the DFP system.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   receiving a request from a remote distributed fabric protocol (DFP) system master, using a dedicated processor of a DFP system member, to register local I²C devices on the DFP system member; and
   sending an acknowledgement to the request back to the DFP system master using the dedicated processor of the DFP system member, wherein the acknowledgement includes a list of local I²C bus devices present on the DFP system member and each local I²C bus device's particular offsets; and
   providing access of the local I²C devices on the DFP system member to the DFP system master.

2. The method as recited in claim 1, further comprising:
   ascertaining which local I²C bus devices are present on the DFP system member, the ascertaining comprising accessing each local I²C bus device of the DFP system member, using a local processor independent of the dedicated processor of the DFP system member;
   enabling the local I²C bus devices to be networked;
   receiving a read request from the DFP system master to read at least one of the local I²C bus devices;
   authenticating the read request; and
   sending details of the at least one of the local I²C bus devices to the DFP system master in response to authenticating the read request.

3. The method as recited in claim 1, further comprising:
   receiving a read request in a first packet from the DFP system master to read at least one of the local I²C bus devices;
   authenticating the read request;
   encapsulating details of the at least one of the local I²C bus devices into the first packet in response to authenticating the read request; and
   sending the first packet into which the details are encapsulated to at least one registered media access control (MAC) address via a network port connected to a local network switch of the DFP system member to be switched to at least the DFP system master in response to encapsulating the details of the at least one of the local I²C bus devices into the first packet.

4. The method as recited in claim 3, wherein the dedicated processor is a field programmable gate array (FPGA), and wherein the first packet into which the details are encapsulated is an enhanced layer 2 transport (EL2T) protocol packet that includes a switch ID of the DFP system member, a local I²C bus device source, an offset, an interrupt type, and an interrupt priority for each of the local I²C bus devices.

5. The method as recited in claim 3, further comprising:
in response to authenticating the read request, sending a message signaled interrupt (MSI) to a local processor of the DFP system member over a PCIe bus connected to a local PCIe switch simultaneously to sending the first packet into which the details are encapsulated; and
switching the first packet to at least the DFP system master using the local network switch.

6. The method as recited in claim 1, further comprising:
causing a local processor to become a member of a DFP system by responding to a request from the DFP system master to join the DFP system;
creating a virtual local area network (VLAN) on a local network switch;
adding a local network port of the local network switch that is connected to the dedicated processor to the VLAN;
loading and initializing the dedicated processor of the DFP system member in response to start up of the DFP system member; and
receiving a request at the local network switch of the DFP system member to become a member of the DFP system.

7. A system, comprising:
a local processor;
one or more local I²C bus devices;
a dedicated processor electrically coupled to the one or more local I²C bus devices, the dedicated processor being configured to:
route interrupts from the one or more local I²C bus devices to the local processor; and
expose the one or more local I²C devices to a remote distributed fabric protocol (DFP) system master by sending details of the one or more local I²C bus devices to the remote DFP system master; and
provide access of the local I²C devices to the remote DFP system master.

8. The system as recited in claim 7, wherein the local processor is configured to handle interrupts from the one or more local I²C bus devices.

9. The system as recited in claim 7, further comprising a peripheral component interconnect express (PCIe) switch electrically coupled to the local processor, the dedicated processor, and a local network switch.

10. The system as recited in claim 7, wherein the dedicated processor is further configured to receive a request from the remote DFP system master to register the one or more local I²C devices.

11. The system as recited in claim 10, wherein the dedicated processor is further configured to send an acknowledgement to the request back to the DFP system master, wherein the acknowledgement includes a list of the one or more local I²C bus devices present.

12. The system as recited in claim 11, wherein the acknowledgement further comprises each of the one or more local I²C bus device's particular offsets.

13. The system as recited in claim 7, wherein the local processor is configured to:
access each local I²C bus device on the system to ascertain which local I²C bus devices are present; and
enable the local I²C bus devices to be networked.

14. The system as recited in claim 7, wherein the dedicated processor is further configured to:
receive a read request in a first packet from the DFP system master to read a local I²C bus device;
authenticate the read request;
encapsulate details of the local I²C bus device into the first packet in response to authenticating the read request; and
send the first packet into which the details are encapsulated to at least one registered media access control (MAC) address via a network port connected to a local network switch to be switched to at least the DFP system master in response to encapsulating the details of the local I²C bus device into the first packet.

15. The system as recited in claim 14, wherein the dedicated processor is a field programmable gate array (FPGA), and wherein the first packet into which the details are encapsulated is an enhanced layer 2 transport (EL2T) protocol packet that includes a switch ID, a local I²C bus device source, an offset, an interrupt type, and an interrupt priority for each of the one or more local I²C bus devices.

16. The system as recited in claim 7, wherein the dedicated processor is further configured to:
cause the system to become a member of a DFP system by responding to a request from the DFP system master to join the DFP system;
create a virtual local area network (VLAN) on a local network switch;
add a local network port of the local network switch that is connected to the dedicated processor to the VLAN; and
load and initialize the dedicated processor upon start up of the system.

17. A system, comprising:
a local processor;
one or more local I²C bus devices; and
a dedicated processor electrically coupled to the one or more local I²C bus devices, the dedicated processor being configured to:
receive a request from a remote distributed fabric protocol (DFP) system master to register the one or more local I²C devices; and
send an acknowledgement to the request back to the DFP system master, wherein the acknowledgement includes a list of the one or more local I²C bus devices and each of the one or more local I²C bus device's particular offsets; and
provide access of the one or more local I²C devices to the remote DFP system master.

18. The system as recited in claim 17, wherein the one or more local I²C devices are exposed to the DFP system master by sending details of the one or more local I²C bus devices via a local network switch to the DFP system master.

19. The system as recited in claim 17, wherein the local processor is further configured to:
access each local I²C bus device of the system to ascertain which local I²C bus devices are present in the system; and
enable the local I²C bus devices to be networked.

* * * * *